US012643247B2

(12) United States Patent
Cho et al.

(10) Patent No.: US 12,643,247 B2
(45) Date of Patent: Jun. 2, 2026

(54) ROBOT HAVING ARTICULATED ARM

(71) Applicant: LG ELECTRONICS INC., Seoul (KR)

(72) Inventors: Hanule Cho, Seoul (KR); Seungryong Han, Seoul (KR); Jinhyeok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/860,070

(22) PCT Filed: Apr. 27, 2022

(86) PCT No.: PCT/KR2022/006047
§ 371 (c)(1),
(2) Date: Oct. 25, 2024

(87) PCT Pub. No.: WO2023/210838
PCT Pub. Date: Nov. 2, 2023

(65) Prior Publication Data
US 2025/0282047 A1        Sep. 11, 2025

(51) Int. Cl.
*B25J 19/00*        (2006.01)
*B25J 18/00*        (2006.01)
*B25J 19/06*        (2006.01)

(52) U.S. Cl.
CPC ......... *B25J 19/0008* (2013.01); *B25J 18/002* (2013.01); *B25J 19/06* (2013.01)

(58) Field of Classification Search
CPC ........ B25J 9/104; B25J 9/1045; B25J 18/002; B25J 19/0008; B25J 19/0016; B25J 19/06; B25J 15/0095
See application file for complete search history.

(56) References Cited

U.S. PATENT DOCUMENTS

| | | | |
|---|---|---|---|
| 4,177,002 A | 12/1979 | Motoda et al. | |
| 4,708,578 A * | 11/1987 | Richter .................... | B25J 9/104 414/720 |
| 2013/0013109 A1* | 1/2013 | Brudniok ............. | B25J 19/0008 700/254 |
| 2017/0348859 A1* | 12/2017 | Takebayashi ........... | B25J 11/00 |

FOREIGN PATENT DOCUMENTS

| | | |
|---|---|---|
| CN | 104325460 A | 2/2015 |
| CN | 104385302 B | 1/2016 |
| EP | 3 078 460 B1 | 9/2021 |
| KR | 10-1506065 B1 | 3/2015 |

OTHER PUBLICATIONS

English translation of CN 104325460 A (Year: 2015).*

* cited by examiner

*Primary Examiner* — Joseph Brown
(74) *Attorney, Agent, or Firm* — Birch, Stewart, Kolasch & Birch, LLP

(57)        ABSTRACT

A robot is disclosed. The robot includes: arms having at least one joint; an end effector coupled to one end of the arms; and a compensation coupler coupled to the end effector.

10 Claims, 10 Drawing Sheets

FIG. 3

ROBOT HAVING ARTICULATED ARM

CROSS REFERENCE TO RELATED APPLICATIONS

This application is the National Phase of PCT International Application No. PCT/KR2022/006047, filed on Apr. 27, 2022, all of which is hereby expressly incorporated by reference into the present application.

TECHNICAL FIELD

The present disclosure relates to a robot. More specifically, the present disclosure relates to a mechanism for payload compensation of a collaborative robot (co-robot or cobot).

BACKGROUND ART

A robot is a machine that can perform tasks autonomously. Robots have been an integral part to achieve production automation, and have been evolved into highly advanced intelligent robots. An intelligent robot refers to a robot that perceives the environment, makes decisions, and performs necessary tasks autonomously.

Intelligent robots are classified into two main categories: industrial robots and service robots, Unlike traditional industrial robots that typically work separately from humans, collaborative robots are designed to work alongside humans in a shared workspace by assisting or replacing human operators in performing tasks. Such collaborative robots are intended to physically interact with humans while performing tasks in a shared workspace, thereby improving the productivity. By contrast, service robots are designed to provide various kinds of services in social infrastructure, with the goal of enhancing the convenience of daily life.

Recently, numerous research has been conducted on intelligent robots.

DISCLOSURE

Technical Problem

It is an objective of the present disclosure to solve the above and other problems.

It is another objective of the present disclosure to provide a robot for performing various tasks.

It is yet another objective of the present disclosure to provide a robot for compensating for a payload in a task that involves the use of a heavy tool.

It is yet another objective of the present disclosure to provide a payload compensation mechanism for heavy-duty tasks of a general-purpose collaborative robot.

Technical Solution

According to an aspect of the subject matter described in this application, a robot includes: arms having at least one joint; an end effector coupled to one end of the arms; and a compensation coupler coupled to the end effector.

Advantageous Effects

A robot according to the present disclosure has the following effects.

According to at least one of the embodiments of the present disclosure, it is possible to provide a robot for performing various tasks.

According to at least one of the embodiments of the present disclosure, it is possible to provide a robot for compensating for a payload in performing a task that involves the use of a heavy tool.

According to at least one of the embodiments of the present disclosure, it is possible to provide a payload compensation mechanism for heavy-duty tasks of a general-purpose collaborative robot.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF DRAWINGS

FIGS. 1 to 10 are diagrams illustrating examples of a robot and a payload compensation mechanism, according to embodiments of the present disclosure.

FIG. 1 illustrates a robot arm on a moving cart according to an embodiment.

FIG. 2 illustrates an exemplary robot arm according to an embodiment.

FIG. 3 illustrates an exploded view of a coupling arrangement of compensation mechanism of a robot arm according to an embodiment.

FIGS. 4-6 illustrate a compensation coupler of a compensation mechanism for a robot arm according to an embodiment.

FIG. 7 illustrates a cable attachment arrangement of a compensation mechanism according to an embodiment.

FIGS. 8-10 illustrate a rail and cable arrangement for a compensation mechanism for a robot arm according to an embodiment.

MODE FOR THE INVENTION

Figure 1:
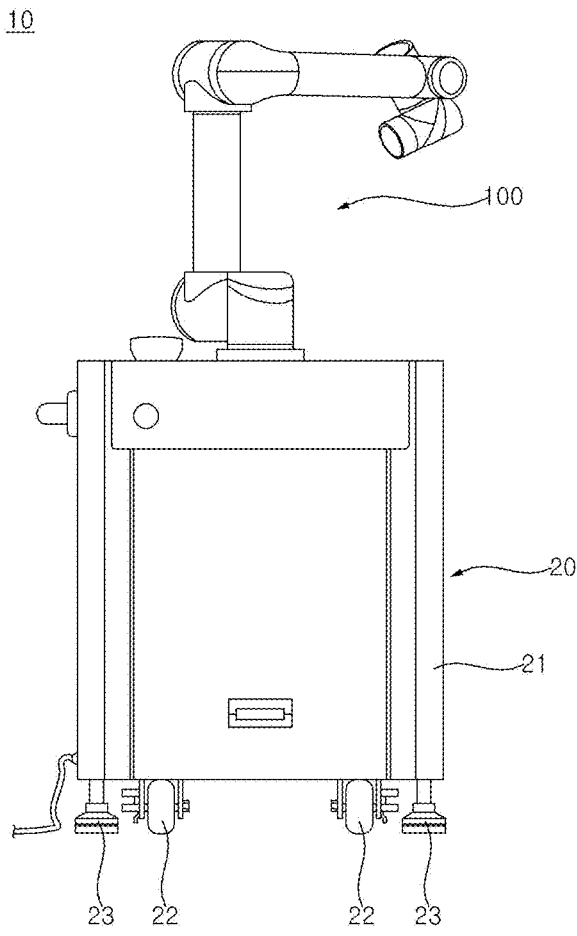

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Although the terms "first," "second," etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

In the following description, when an embodiment is described with reference to a specific figure, reference numeral not shown in the specific figure may be mentioned, if necessary or desired. However, the reference numeral not shown in the specific figure may be mentioned only when the reference numeral is shown in other figures.

Referring to FIG. 1, a robot 10 may include a moving cart 20 and a robot arm 100. The robot arm 100 may be mounted on the moving cart 20. The robot arm 100 may be an articulated arm 100. The moving cart 20 may provide coordinates to the robot arm 100, and the robot arm 100 may move according to the coordinates provided by the moving cart 20.

The moving cart 20 may include a cabinet 21 and a wheel 22. The cabinet 21 may define an accommodation space therein. The robot arm 100 may be rotatably mounted on the cabinet 21. The wheel 22 may be installed on a bottom of the cabinet 21. The wheel 22 may allow the cabinet 21 to move freely.

A foot 23 may be installed on the bottom of the cabinet 21 while being adjacent to the wheel 22. The foot 23 may limit movement of the cabinet 21. The foot 23 may move in an up-and-down direction of the cabinet 21. The foot 23 may be kept or stored inside the cabinet 21, and its length may be increased as the foot 23 moves to an outside of the cabinet 21. When the length of the foot 23 is increased, movement of the cabinet 21 may be inhibited, thereby allowing the cabinet 21 to be secured to a floor.

Figure 2:
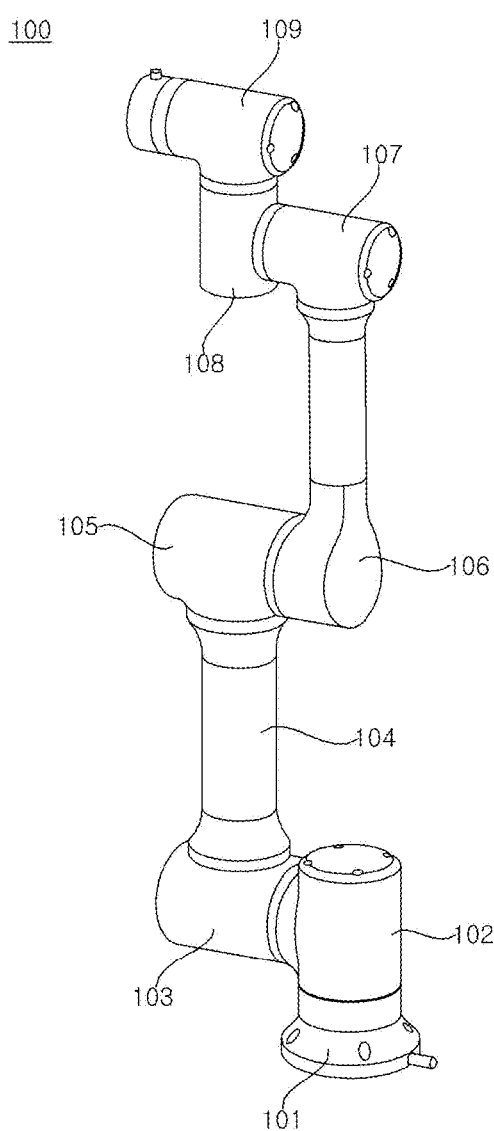

Referring to FIG. 2, the robot arm 100 may include a first arm 101, a second arm 102, and a third arm 103. The first arm 101 may be referred to as a mount base 101. The first arm 101 may be rotatably mounted on top of the moving cart 20 (see FIG. 1). The second arm 102 may be rotatably coupled to the first arm 101. The third arm 103 may be rotatably coupled to the second arm 102. A rotation axis of the third arm 103 may intersect a rotation axis of the second arm 102.

The robot arm 100 may further include a fourth arm 104. The fourth arm 104 may be rotatably coupled to the third arm 103. A rotation axis of the fourth arm 104 may intersect the rotation axis of the third arm 103. The rotation axis of the fourth arm 104 may be parallel to the rotation axis of the second arm 102.

The robot arm 100 may further include a fifth arm 105, a sixth arm 106, a seventh arm 107, an eighth arm 108, and a ninth arm 109. The number of arms included in the robot arm 100 is not limited thereto.

Figure 3:
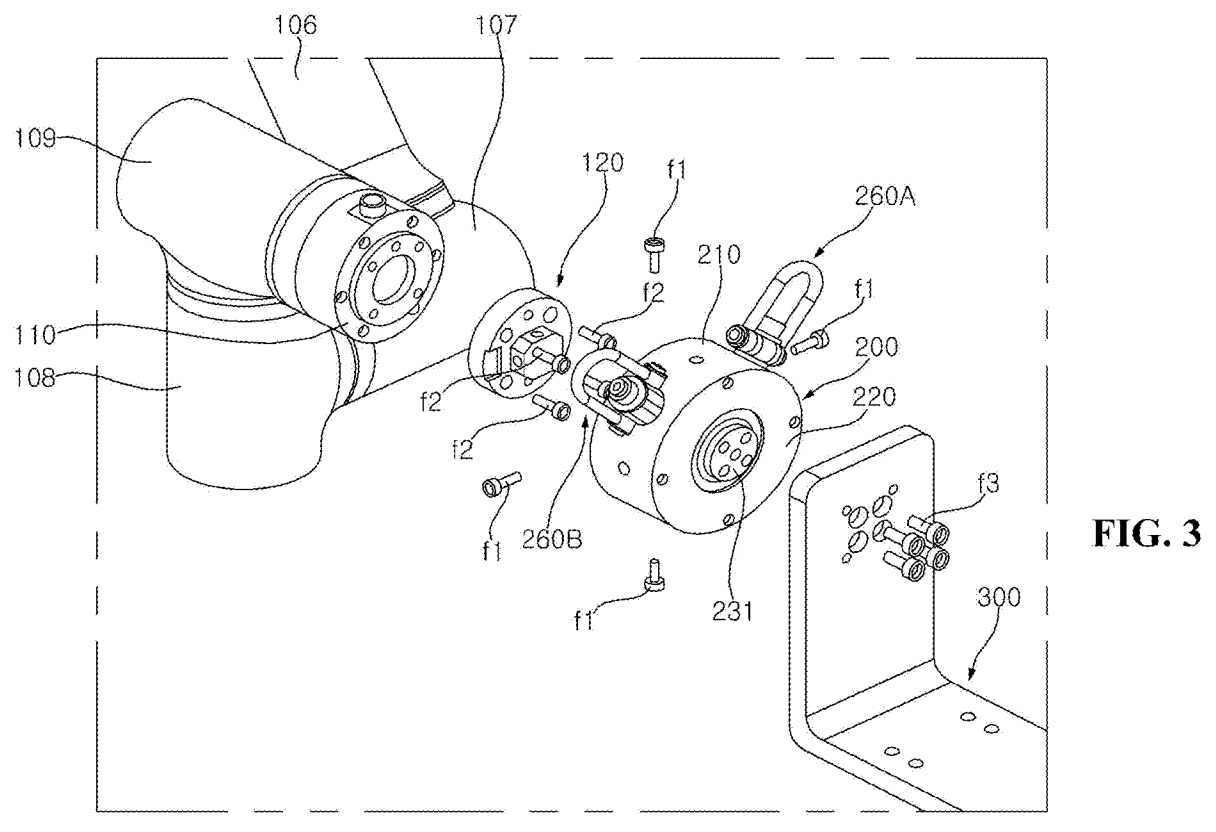

Referring to FIG. 3, an end effector 110 may be coupled to the robot arm 109. A first tool 120 may be coupled to the end effector 110. The first tool 120 may be fixed to the end effector 110 so as to move together with the end effector 110. For example, when the end effector 110 rotates, the first tool 120 may rotate together with the end effector 110.

A second tool 200 may be coupled to the first tool 120. A third tool 300 may be coupled to the second tool 200. The third tool 300 may rotate together with the first tool 120. The second tool 200 may be referred to as a coupler 200 or a compensation coupler 200. The third tool 300 may be referred to as a load base 300.

When the end effector 110 rotates, the first tool 120 and the third tool 300 may rotate together with the end effector 110. The third tool 300 and the first tool 120 may be connected to each other by the second tool 200. The third tool 300 and the first tool 120 may move relative to the second tool 200. The first tool 120 may be coupled or fixed to the end effector 110 by a fastening member f2.

Figure 4:
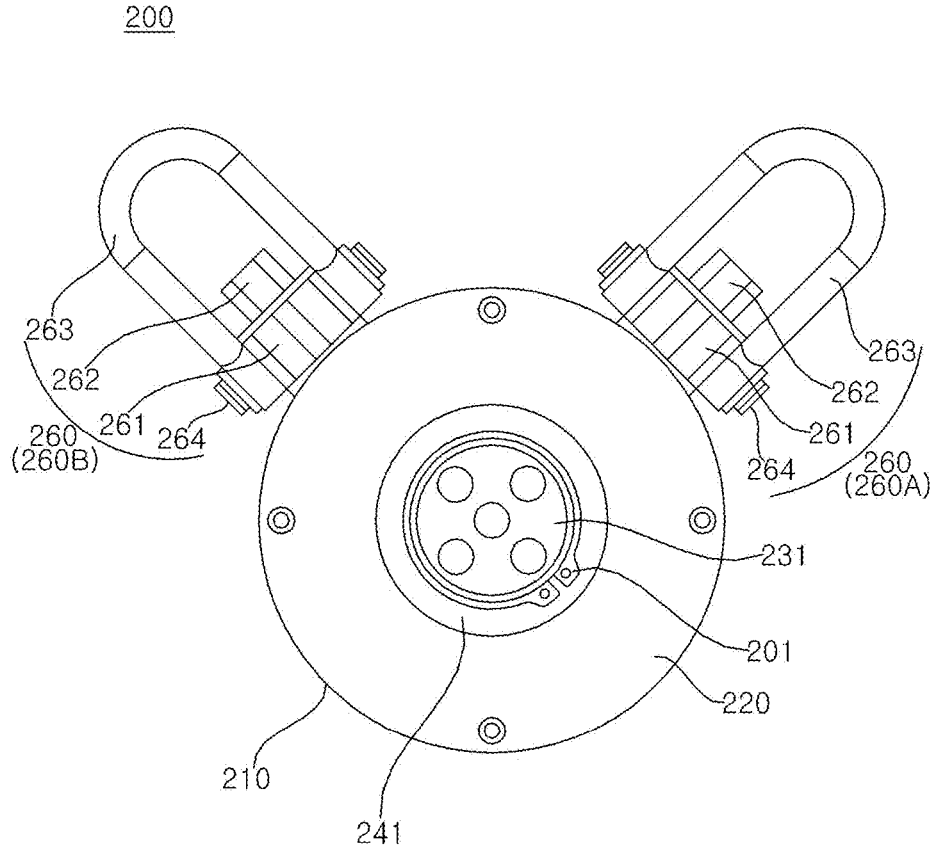
Figure 5:
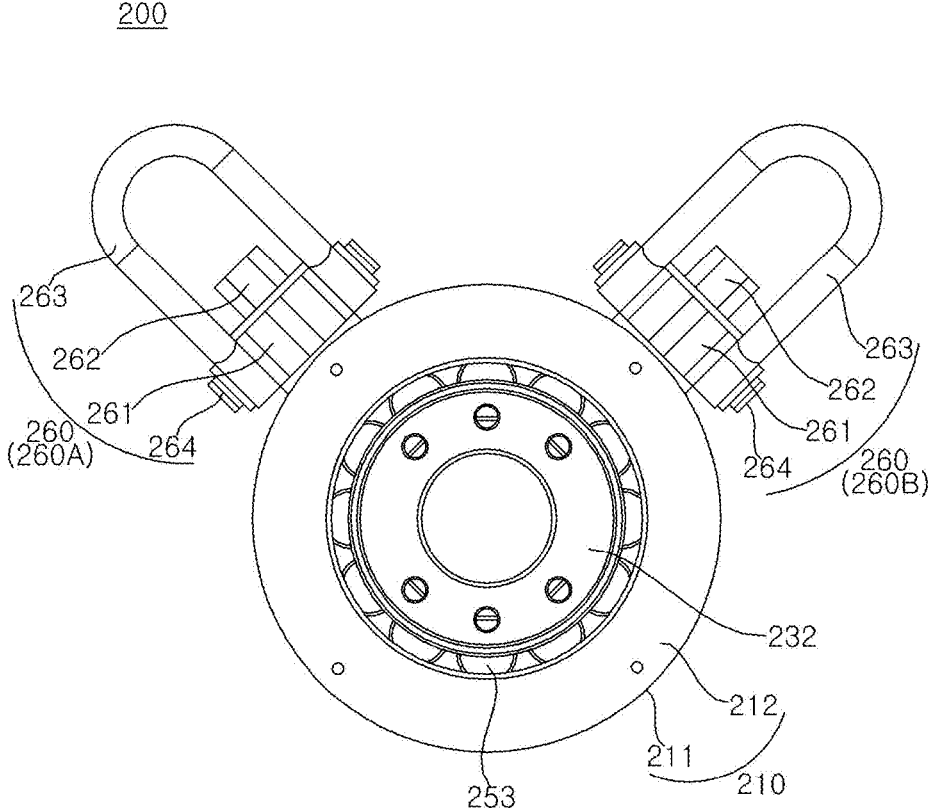
Figure 6:
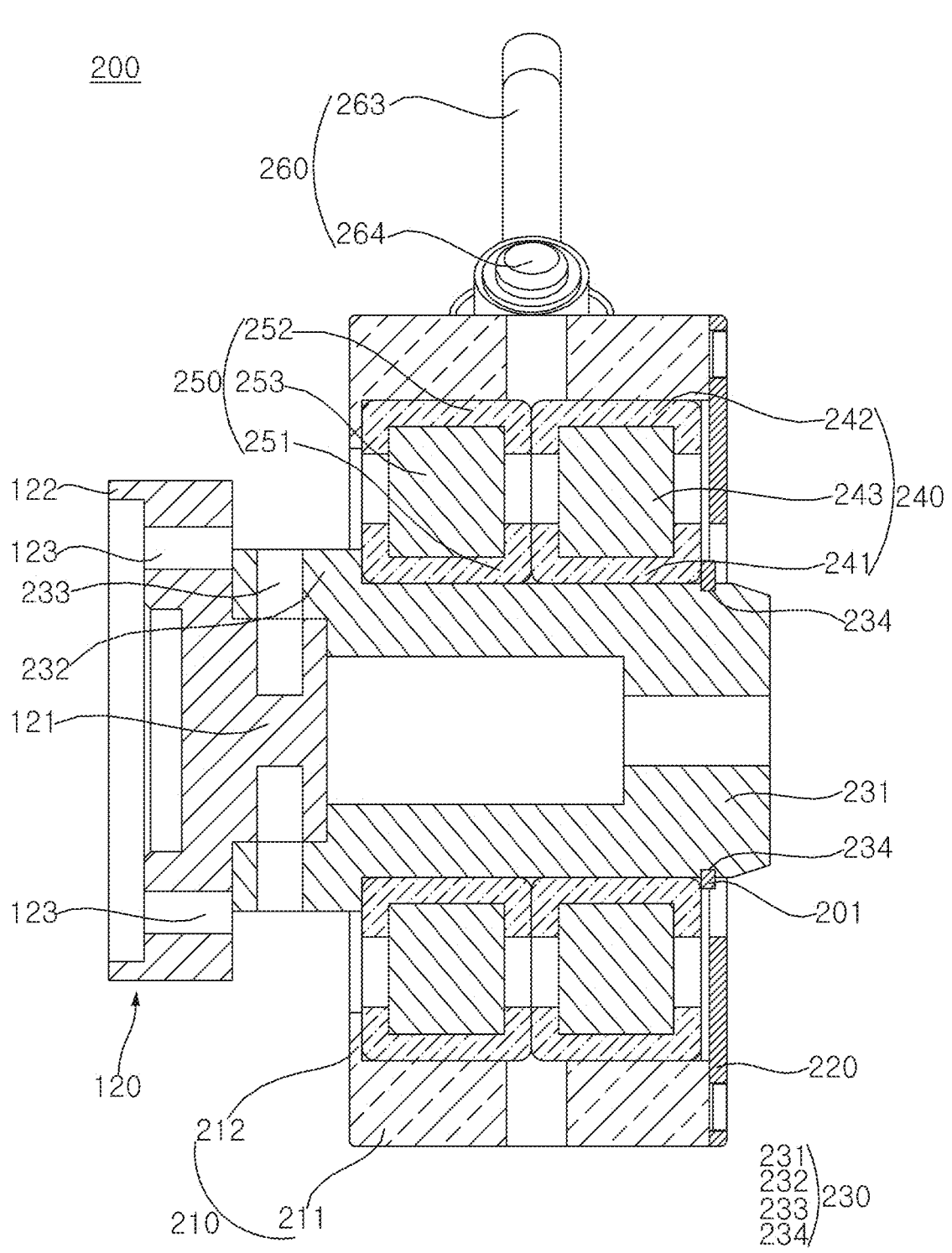

Referring to FIGS. 4 to 6, the compensation coupler 200 may include a case 210, a rotating shaft 230, a bearing 240, 250, and a cover 220. The case 210 may be of a cylindrical shape, and may have openings at opposite ends thereof. The openings at the opposite ends of the case 210 may have different diameters. The case 210 may include a body 211 and an end rim 212. The body 211 may be of a cylindrical shape, and the end rim 212 may be a donut-shaped disc (or disk). An outer diameter of the end rim 212 may be substantially equal to an outer diameter of the body 211, and an inner diameter of the end rim 212 may be less than an inner diameter of the body 211.

The bearing 240, 250 may include an inner ring 241, 251, an outer ring 242, 252, and a roller 243, 253. A diameter of the outer ring 242, 252 may be greater than a diameter of the inner ring 241, 251, and the roller 243, 253 may be inserted between the outer ring 242, 252 and the inner ring 241, 251. The inner ring 241, 251 may rotate relative to the outer ring 242, 252. The bearing 240, 250 may be inserted into the case 210. The outer ring 242, 252 of the bearing 240, 250 may be in contact with or fixed to an inside of the body 211. The outer ring 242, 252 of the bearing 240, 250 may be supported by the end rim 212 of the body 211. The end rim 212 of the body 211 may be in contact with the outer ring 242, 252 of the bearing 240, 250. There may be a plurality of bearings 240 and 250.

The rotating shaft 230 may be inserted into the case 210 so as to rotate therein. The rotating shaft 230 may be inserted into the inner ring 241, 251 of the bearing 240, 250. The rotating shaft 230 may be press-fitted into or fixed to the inner ring 241, 251 of the bearing 240, 250. The rotating shaft 230 may include a shaft body 231 and a flange 232. The shaft body 231 may be an elongated cylinder, and may be inserted into the inner ring 241, 251 of the bearing 240, 250. The shaft body 231 may rotate together with the inner ring 241, 251 of the bearing 240, 250. The flange 232 may be provided at or fixed to a first end of the shaft body 231. The flange 232 may have a disk shape. An outer diameter of the flange 232 may be greater than an outer diameter of the shaft body 231. The flange 232 may be supported by or in contact with the inner ring 241, 251 of the bearing 240, 250. A groove 234 may be formed in an outer circumferential surface of the shaft body 231 while being adjacent to a second end of the shaft body 231. A lock washer 201 may be inserted into the groove 234 of the shaft body 231. When the lock washer 201 is fitted into the groove 234 of the shaft body 231, the lock washer 201 may come into contact with the inner ring 241, 251 of the bearing 240, 250. Accordingly, the rotating shaft 230 may be fixed to the inner ring 241, 251 of the bearing 240, 250.

The cover 220 may be coupled to the body 211 of the case 210. The cover 220 may fix the bearing 240, 250 inside the case 210. The cover 220 may be disposed opposite the end rim 212 with respect to the bearing 240, 250.

A coupling hole 233 may be formed in an outer circumferential surface of the flange 232. The coupling hole 233 may be formed in a radial direction of the flange 232. The coupling hole 233 may be provided in plurality. The first tool 120 may be coupled or fixed to the flange 232. The first tool 120 may include a shaft 121, a flange 122, and a fastening hole 123. The coupling hole 233 may extend to the shaft 121 of the first tool 120. The fastening hole 233 may be formed in the flange 232 in an axial direction. A first fastening member f1 (see FIG. 3) may be inserted into the coupling hole 233 to allow the rotating shaft 230 and the first tool 120 to be coupled to each other, and a second fastening member f2 (see FIG. 3) may be inserted into the coupling hole 123 to allow the first tool 120 and the end effector 110 (see FIG. 3) to be coupled to each other.

A swivel 260 may be rotatably coupled to the case 210. A plurality of swivels 260 may be provided. The plurality of swivels 260 may include a first swivel 260A and a second swivel 260B. The first swivel 260A may be spaced apart from the second swivel 260B in a circumferential direction of the case 210. The description of the first swivel 260A is equally applicable to the second swivel 260B.

The swivel 260 may include a rotary body 261, bolts 262 and 264, and a biner 263. The rotary body 261 may be rotatably coupled to an outer circumferential surface of the case 210 by the bolts 262 and 264. The rotary body 261 may rotate about the bolts 262 and 264. The biner 263 may be pivotably coupled to the rotary body 261. For example, the biner 263 may be U-shaped. Both ends of the biner 263 may be pivotably coupled to the rotary body 261 by the bolts 262 and 264.

Figure 7:
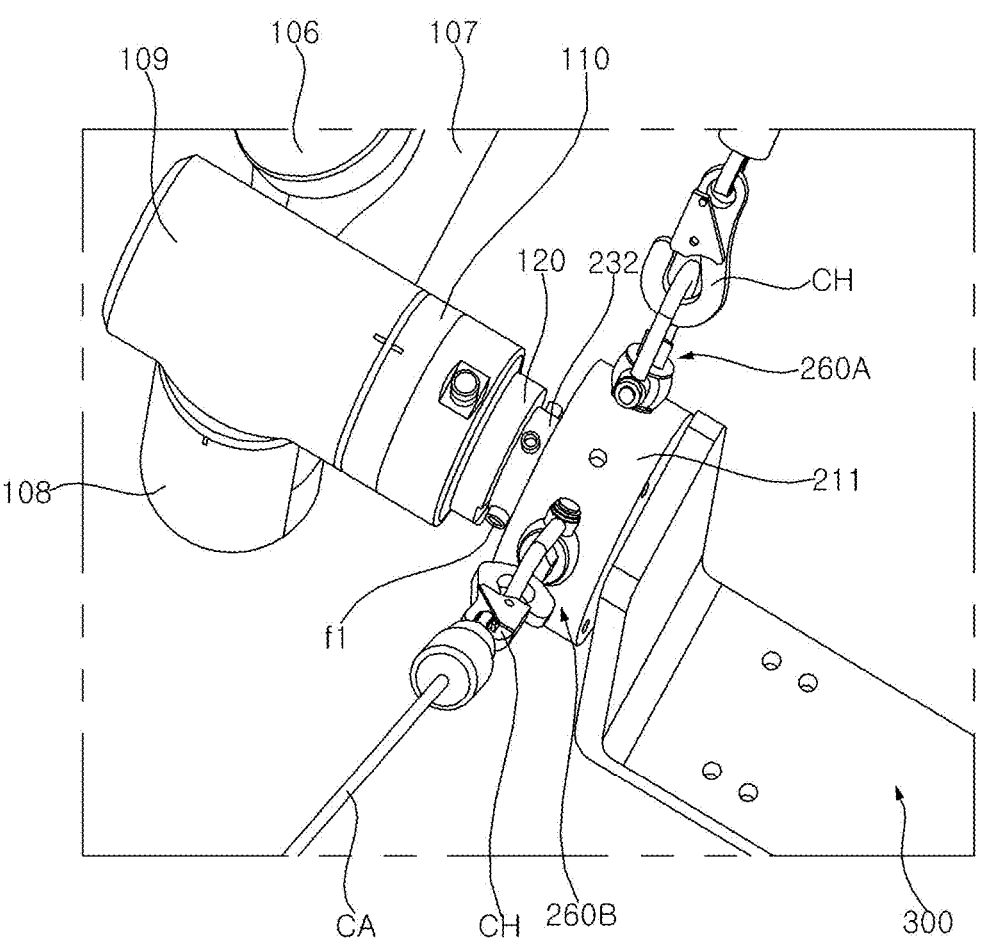

Referring to FIG. 7, the first tool 120 may be coupled to the end effector 110 of the arms 106, 107, 108 and 109, the compensation coupler 200 may be coupled to the first tool 120, and the third tool 300 may be coupled to the compensation coupler 200. A cable CA may be hooked to the swivel 260A, 260B by a cable hook CH. A first cable CA may be coupled to the first swivel 260A, and a second cable CA may be coupled to the second swivel 260B. The cables CA may pull the compensation coupler 200. In this case, the force with which the cables CA pull the compensation coupler 200 may correspond to the weight of the third tool 300. Accordingly, the arms 106, 107, 108 and 109 and/or the end effector 110 may be operated regardless of the weight of the third tool 300.

Figure 8:
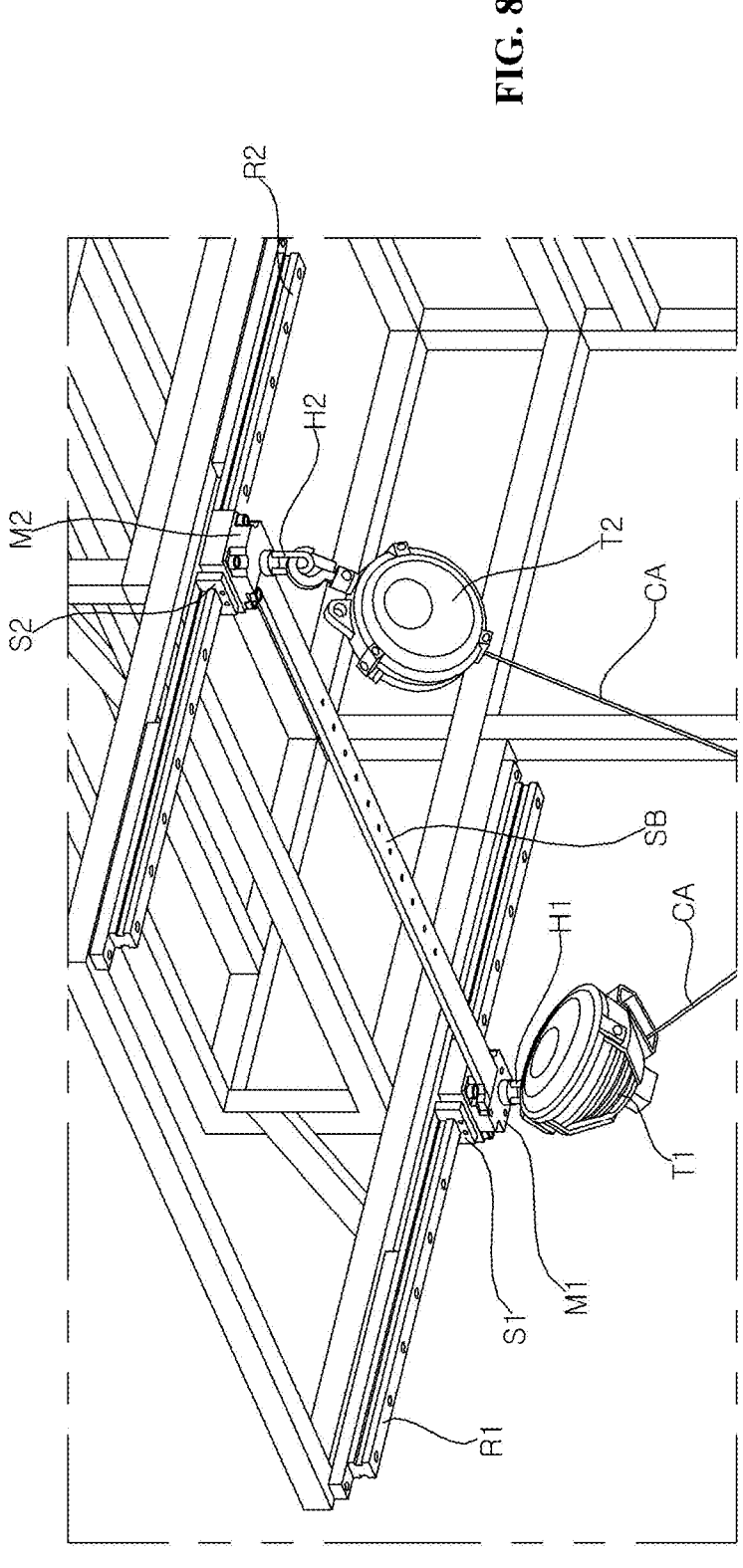

Referring to FIG. 8 along with FIG. 7, a rail R1, R2 may be installed at a fixture (or structure). There may be a plurality of rails R1 and R2. A first rail R1 may be fixed to the fixture, and a second rail R2 may be disposed in parallel with the first rail R1 and fixed to the fixture. A moving block S1, S2 may be movable on the rail R1, R2. A first moving block S1 may be movable on the first rail R1, and a second moving block S2 may be movable on the second rail R2. A first mount M1 may be mounted on the first moving block S1. A second mount M2 may be mounted on the second moving block S2. A strut bar SB may connect the first mount M1 and the second mount M2.

A third swivel H1 may be pivotably coupled to the first mount M1, and a fourth swivel H2 may be pivotably coupled to the second mount M2. A first spring balancer T1 may be coupled to the third swivel H1, and a second spring balancer T2 may be coupled to the fourth swivel H2. The first cable CA may be wound on or unwound from the first spring balancer T1, and the second cable CA may be wound on or unwound from the second spring balancer T2.

Figure 9:
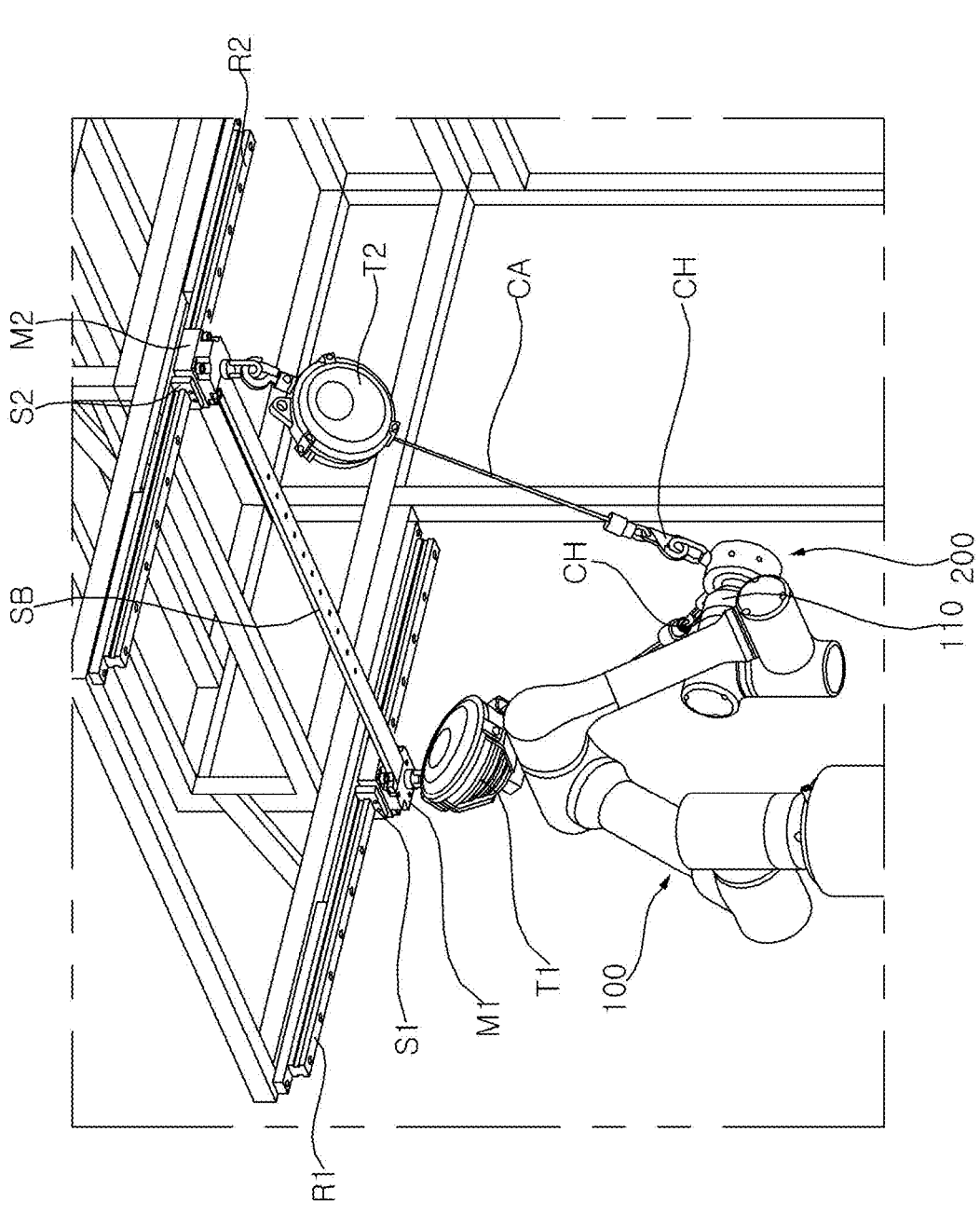
Figure 10:
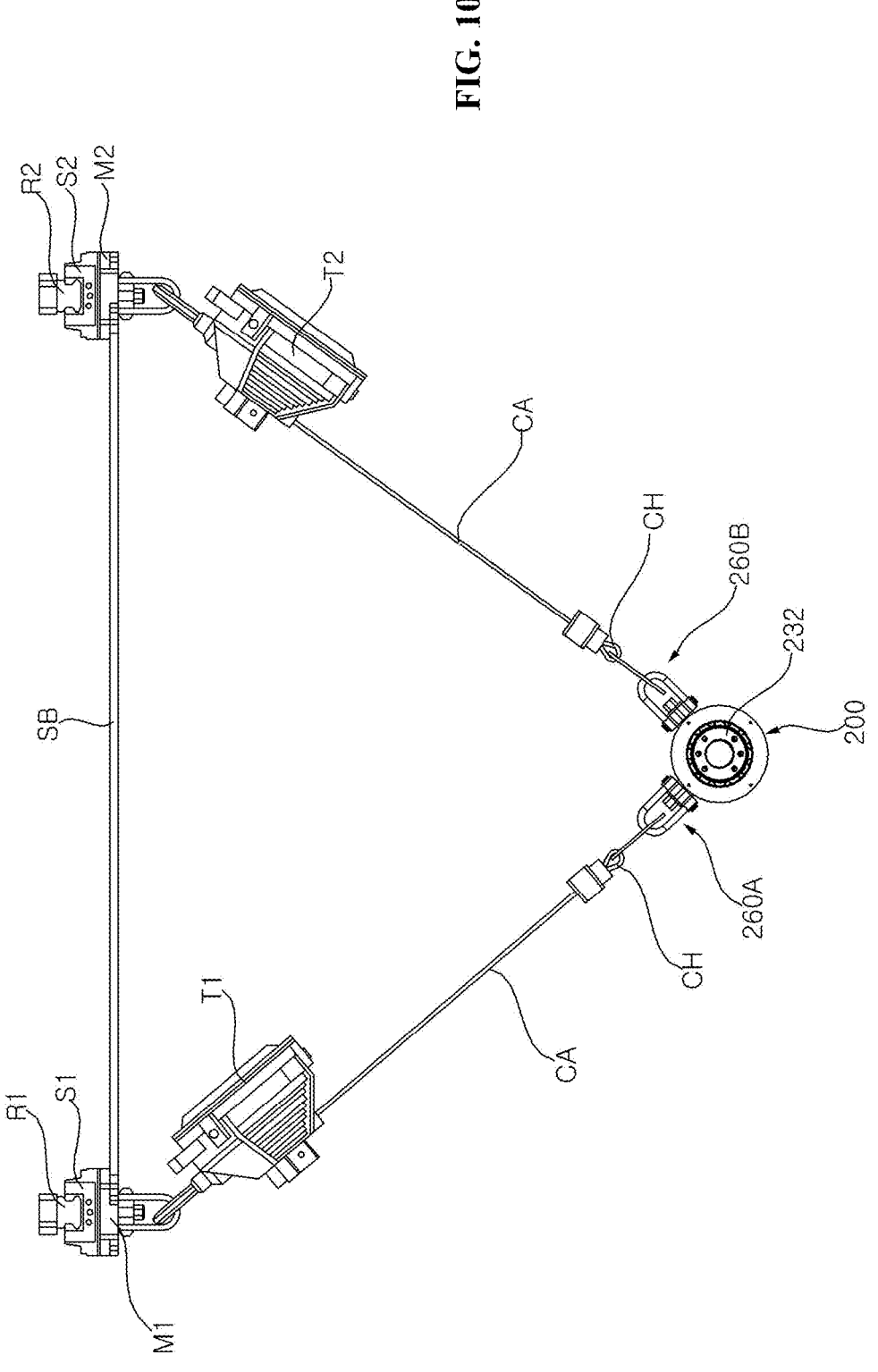

Referring to FIGS. 9 and 10, the compensation coupler 200 may offset the weight of a load on the rotating shaft 230 by the cables CA. For example, the sum of forces (the vector sum of forces) acting on the rotating shaft 230 may be zero. The tension of the spring balancers T1 and T2 may correspond to the load acting on the rotating shaft 230. Accordingly, the end effector 110 may be moved by the arms 100 regardless of the weight of the load on the rotating shaft 230.

When the robot arm 100 is operated, coordinates of the end effector 110 may be variously defined. As the end effector 110 moves, the cable CA and the spring balancer T1, T2, which are coupled to the compensation coupler 200, may move on the rail R1, R2, thereby achieving the degree of freedom of movement of the robot arm 100.

The robot arm 100 may be moved into a workspace where human operators work for collaboration. Regardless of the weight of a tool required for a task, the general-purpose robot arm 100 may replace humans in performing tasks or collaborate with humans to perform tasks.

Referring to FIGS. 1 to 10, a robot may include: arms having at least one joint; an end effector coupled to one end of the arms; and a compensation coupler coupled to the end effector. The compensation coupler may include: a case that defines an accommodation space therein; a rotating shaft passing through the accommodation space and configured to be rotatable; and a bearing positioned between the case and the rotating shaft. The rotating shaft may be coupled to the end effector.

The compensation coupler may include a plurality of swivels rotatably coupled to the case. Each of the plurality of swivels may include: a rotary body configured to rotate on the case; and a biner pivotably coupled to the rotary body.

A pivot axis of the biner may intersect a rotation axis of the rotary body.

The case may include: a body having a cylindrical shape, with openings at opposite ends of the body; an end rim formed at the opening of a first end of the body, the end rim having an inner diameter less than an inner diameter of the body; and a cover coupled to the opening of a second end of the body, the cover having an inner diameter less than the inner diameter of the end rim. The bearing may include: an outer ring in contact with the body and the end rim; an inner ring disposed within the outer ring; and a roller inserted between the outer ring and the inner ring.

The rotating shaft may include: a shaft body press-fitted into the inner ring of the bearing; and a flange disposed adjacent to the end rim of the case and provided at a first end of the shaft body, the flange having an outer diameter greater than an outer diameter of the shaft body. The inner ring of the bearing may be in contact with the flange.

The compensation coupler may further include a lock washer that is disposed adjacent to the cover, fixed to an outer circumferential surface of the shaft body of the rotating shaft, and in contact with the inner ring of the bearing.

The robot may further include: a tool fixed to the rotating shaft; and a plurality of cables coupled to the plurality of swivels, respectively. A resultant force of the plurality of cables may correspond to a weight of the tool.

The robot may further include: a plurality of rails; and a plurality of moving blocks movable on the plurality of rails, respectively. The plurality of cables may be connected to the plurality of moving blocks, respectively.

A payload compensation system of a robot may include: a plurality of fixed rails; a plurality of moving blocks movable on the plurality of rails, respectively; a plurality of cables connected to the plurality of moving blocks, respectively; the robot having an end effector and including arms having at least one joint; and a compensation coupler coupled to the end effector and connected to the plurality of cables.

The plurality of cables may be respectively coupled to the plurality of moving blocks by a respective plurality of spring balancers.

The compensation coupler may include: a case that defines an accommodation space therein; a rotating shaft passing through the accommodation space and configured to be rotatable; and a bearing positioned between the case and the rotating shaft. The rotating shaft may be coupled to the end effector.

The compensation coupler may include a plurality of swivels rotatably coupled to the case. Each of the plurality of swivels may include: a rotary body configured to rotate on the case; and a biner pivotably coupled to the rotary body. The plurality of cables may be coupled to the plurality of biners, respectively.

A pivot axis of the biner may intersect a rotation axis of the rotary body.

The payload compensation system may further include a tool fixed to the rotating shaft. A resultant force of the plurality of cables may correspond to a weight of the tool.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A robot comprising:
an articulated arm comprising a plurality of links;
an end effector coupled to one end of the articulated arm; and
a compensation coupler coupled to the end effector,
wherein the compensation coupler comprises:
a case that defines an accommodation space therein;
a rotating shaft passing through the accommodation space and configured to be rotatable;
a bearing positioned between the case and the rotating shaft; and
a plurality of swivels rotatably coupled to the case,
wherein the rotating shaft is coupled to the end effector,
wherein each of the plurality of swivels comprises:
a rotary body configured to rotate on the case; and
a biner pivotably coupled to the rotary body,
wherein the case comprises:
a body having a cylindrical shape, with openings at opposite ends of the body;
an end rim formed at the opening of a first end of the body, the end rim having an inner diameter less than an inner diameter of the body; and
a cover coupled to the opening of a second end of the body, the cover having an inner diameter less than the inner diameter of the end rim, and
wherein the bearing comprises:
an outer ring in contact with the body and the end rim;
an inner ring disposed within the outer ring; and

8 a roller inserted between the outer ring and the inner ring.

2. The robot of claim 1, wherein a pivot axis of the biner intersects a rotation axis of the rotary body.

3. The robot of claim 1, wherein the rotating shaft comprises:
a shaft body press-fitted into the inner ring of the bearing; and
a flange disposed adjacent to the end rim of the case and provided at a first end of the shaft body, the flange having an outer diameter greater than an outer diameter of the shaft body, and
wherein the inner ring of the bearing is in contact with the flange.

4. The robot of claim 3, further comprising a lock washer disposed adjacent to the cover and fixed to an outer circumferential surface of the shaft body of the rotating shaft, the lock washer being in contact with the inner ring of the bearing.

5. The robot of claim 1, further comprising:
a tool fixed to the rotating shaft; and
a plurality of cables coupled to the plurality of swivels, respectively,
wherein the plurality of cables support a weight of the tool.

6. The robot of claim 5, further comprising:
a plurality of rails; and
a plurality of moving blocks movable on the plurality of rails, respectively,
wherein the plurality of cables are connected to the plurality of moving blocks, respectively.

7. A payload compensation system of a robot, the payload compensation system comprising:
a plurality of fixed rails;
a plurality of moving blocks movable on the plurality of rails, respectively;
a plurality of cables connected to the plurality of moving blocks, respectively;
the robot including an end effector and an articulated arm with a plurality of links; and
a compensation coupler coupled to the end effector and connected to the plurality of cables,
wherein the compensation coupler comprises:
a case that defines an accommodation space therein;
a rotating shaft passing through the accommodation space and configured to be rotatable; and
a bearing positioned between the case and the rotating shaft;
a plurality of swivels rotatably coupled to the case,
wherein the rotating shaft is coupled to the end effector,
wherein each of the plurality of swivels comprises:
a rotary body configured to rotate on the case; and
a biner pivotably coupled to the rotary body,
wherein the plurality of cables are coupled to the plurality of biners, respectively,
wherein the case comprises:
a body having a cylindrical shape, with openings at opposite ends of the body;
an end rim formed at the opening of a first end of the body, the end rim having an inner diameter less than an inner diameter of the body; and
a cover coupled to the opening of a second end of the body, the cover having an inner diameter less than the inner diameter of the end rim, and
wherein the bearing comprises:
an outer ring in contact with the body and the end rim;
an inner ring disposed within the outer ring; and a roller inserted between the outer ring and the inner
ring.

8. The payload compensation system of claim 7, wherein
the plurality of cables are respectively coupled to the plu-
rality of moving blocks by a respective plurality of spring
balancers.

9. The payload compensation system of claim 7, wherein,
for each of the swivels, a pivot axis of the biner intersects a
rotation axis of the rotary body.

10. The payload compensation system of claim 7, further
comprising a tool fixed to the rotating shaft,
   wherein the plurality of cables support a weight of the
   tool.

\*  \*  \*  \*  \*